United States Patent [19]
Tominaga et al.

[11] Patent Number: 5,569,517
[45] Date of Patent: Oct. 29, 1996

[54] OPTICAL INFORMATION MEDIUM

[75] Inventors: Junji Tominaga, Nagano; Susumu Haratani, Chiba; Ryo Inaba; Tsuneo Kuwahara, both of Nagano, all of Japan

[73] Assignee: TDK Corporation, Tokyo, Japan

[21] Appl. No.: 462,286

[22] Filed: Jun. 5, 1995

[30] Foreign Application Priority Data

Jun. 23, 1994 [JP] Japan .................................. 6-164577

[51] Int. Cl.$^6$ ...................................................... B32B 3/00
[52] U.S. Cl. ...................... 428/64.1; 428/64.2; 428/64.4; 428/64.5; 428/64.6; 428/913; 430/270.1; 430/270.11; 430/270.12; 430/270.13; 430/495.1; 430/945; 369/275.2; 369/283; 369/288
[58] Field of Search ................................ 428/64.1, 64.2, 428/64.4, 64.5, 64.6, 457, 913; 430/270, 495, 945, 270.1, 270.11, 270.12, 270.13; 369/275.2, 283, 288

[56] References Cited

U.S. PATENT DOCUMENTS

| | | | |
|---|---|---|---|
| 5,153,873 | 10/1992 | Spruit et al. | 369/275.2 |
| 5,348,783 | 9/1994 | Ohno | 428/64.1 |
| 5,389,417 | 2/1995 | Tominaga | 428/64.1 |
| 5,418,030 | 5/1995 | Tominaga | 428/64.1 |

FOREIGN PATENT DOCUMENTS

| | | |
|---|---|---|
| 296926 | 9/1990 | Japan . |
| 3264611 | 4/1993 | Japan . |
| 3264609 | 4/1993 | Japan . |
| 3249511 | 4/1993 | Japan . |

OTHER PUBLICATIONS

Premastered Optical Disk by Superresolution; Yasuda et al. pp. 65–66; Joint International Symposium on Optical Memory and Optical Data Storage; Jul. 5–9, 1993.

Optical Storage Read–Out of Nonlinear Disks; Bouwhuis et al.; pp. 3766–3768; Applied Optics; vol. 29, No. 26; 10 Sep. 1990.

New Opto–Magnetic Disk, Irister; Miyaoka; pp. 393–398; Solid Phisics; vol. 26; No. 6 (1991).

*Primary Examiner*—Patrick Ryan
*Assistant Examiner*—Elizabeth Evans
*Attorney, Agent, or Firm*—Watson Cole Stevens Davis, PLLC

[57] ABSTRACT

An optical information medium has on a substrate (2) with information-carrying pits (21), a light transmittance control layer (3) including a lower dielectric layer (31), a mask layer (32) and an upper dielectric layer (33). The mask layer has an original state before irradiation of reading light. Upon irradiation of a reading light beam to define a beam spot, the mask layer undergoes a crystal-to-crystal transition in a region (H) of the beam spot depending on the intensity distribution of the beam spot. Multiple reflection condition changes in the transition portion so that the beam spot contributing to read-out is limited to the transition or transition-free region (H or L). The transition temperature is in the range of 200° to 450° C. The mask layer returns to the original state after passage of the beam spot. The invention is also applicable to an optical recording medium having a recording layer above or below the transmittance control layer.

14 Claims, 5 Drawing Sheets

RELATIVE MOTION DIRECTION OF
RECORDING AND READING LIGHT

OPTICAL INFORMATION MEDIUM

TECHNICAL FIELD

This invention relates to an optical information medium having a high recording density.

BACKGROUND ART

Optical information media include read only optical discs as typified by compact discs, erasable optical recording discs such as magneto-optical recording discs and phase change type recording discs, and write-once optical recording discs using organic dyes as the recording material.

In general, optical information media have a high information density as compared with magnetic recording media. It is now required to further increase the information density for processing a very large quantity of information as in picture processing. Information density per unit area can be increased in two ways, by reducing a track pitch and by reducing the distance between record marks or phase pits for achieving an increased linear density. However, as the track density or linear density is increased relative to a beam spot of reading light, C/N of read signals becomes poor and eventually signal read-out becomes impossible. Resolution upon signal read-out is determined by the diameter of a beam spot. More particularly, when signals are read out through an optical system having an objective lens with a numerical aperture NA using reading light having a wavelength 1, a spatial frequency 2NA/1 becomes a limit of read-out. Therefore, for improving the C/N and resolution of read signals, it is effective to reduce the wavelength of reading light and to increase NA. Many research works have been carried out in this regard, but there still remain many technical problems to be solved.

JP-A 96926/1990 or U.S. Pat. No. 5,153,873 proposes a recording carrier having a layer of non-linear optical material for achieving super-resolution. This non-linear optical material changes its optical properties by incident radiation. Such changes include changes of transmittance, reflectance, and refractive index as well as deformation of the layer. When a high intensity beam is irradiated to the information-carrying surface through the non-linear optical material layer, smaller areas of the object can be read out by these optical changes.

The above-cited patent reference discloses a bleaching layer as one example of the non-linear optical material layer. The bleaching layer increases transmittance with the increasing intensity of incident radiation. Exemplary materials used in the bleaching layer are gallium arsenide, indium arsenide and indium antimony. However, since the layer of such non-linear optical material requires the absorption center to be entirely excited, reading light must have a high energy density, imposing difficulty to material and medium design.

The above-cited patent reference also discloses use of a phase change material as the non-linear optical material. Exemplary phase change materials are GaSb and InSb. The patent reference describes: "It has been found that the complex refractive index of this type of material is temperature dependent to such an extent that, even in the case of irradiation with an intensity remaining below the level at which the conversion from amorphous to crystalline or conversely occurs, there is a sufficiently large variation of the complex refractive index to enable layers of these materials to be used as non-linear layers in the sense of the present invention." Although the reason why such a change of complex refractive index occurs is not described in the patent reference, it is presumed that this change of complex refractive index involves a crystal-to-crystal transition of the non-linear optical material layer. In this case, since there is no need to melt the non-linear optical material, reading light of low power can be used. However, GaSb has a crystal-to-crystal transition temperature at a low temperature of about 30° C. or a high temperature of about 590° C. and InSb has a crystal-to-crystal transition temperature at a low temperature of about 150° C. or a high temperature of about 500° C. When the higher transition temperature of these phase change materials is utilized, reading light of high power must be used, giving rise to problems as mentioned above. On the other hand, when the lower transition temperature of these phase change materials is utilized, reading light of low power can be used. However, stable read-out is substantially impossible with GaSb because the transition temperature is extremely low. Problems also arise with InSb. Since the transition temperature is relatively low, the non-linear optical material layer is slow in cooling rate. Heat accumulates in the proximity of a mask layer to enlarge the apparent diameter of a beam spot, adversely affecting super-resolution read-out.

JP-A 89511/1993, 109117/1993, and 109119/1993 disclose an optical disc comprising a transparent substrate having formed therein phase pits which can be optically read out and a material layer thereon which changes its reflectance with temperature. This material layer is provided for achieving higher resolution beyond the limit determined by the reading light wavelength 1 and objective lens numerical aperture NA through approximately the same function as the non-linear optical material layer of JP-A 96926/1990. However, this material layer requires reading light of higher power because a crystal-to-liquid or amorphous-to-liquid change is necessary for read-out.

SUMMARY OF THE INVENTION

Therefore an object of the present invention is to provide an optical information medium from which high density information can be read out using reading light of low power in a stable manner without resorting to the conventional means of reducing the wavelength of reading light or increasing the numerical aperture of an objective lens in optical read system.

According to a first aspect of the present invention, there is provided an optical information medium comprising a substrate having pits formed on one surface for carrying information. A light transmittance control layer including a lower dielectric layer, a mask layer and an upper dielectric layer is disposed on the substrate surface. The mask layer has an original state before irradiation of reading light. The mask layer undergoes a crystal-to-crystal transition upon irradiation of reading light to introduce a change in the reflectance of reading light. The crystal-to-crystal transition takes place at a temperature of 200° to 450° C. The mask layer returns to the original state after irradiation of reading light. Preferably the medium further includes a reflecting layer above or below the light transmittance control layer.

According to a second aspect of the present invention, there is provided an optical information medium comprising a substrate, a light transmittance control layer on a surface of the substrate including a lower dielectric layer, a mask layer and an upper dielectric layer, and a recording layer above or below the light transmittance control layer. The mask layer has an original state before irradiation of reading light. The mask layer undergoes a crystal-to-crystal transition upon irradiation of reading light to introduce a change in the reflectance of reading light. The crystal-to-crystal transition takes place at a temperature of 200° to 450° C. The mask layer returns to the original state after irradiation of reading light. Preferably the medium further includes a reflecting layer. The recording layer is interposed between the light transmittance control layer and the reflecting layer. Alternatively, the light transmittance control layer is interposed between the recording layer and the reflecting layer.

The recording layer may be either of phase change type or of magneto-optical type whereby the optical information medium constitutes an optical recording medium.

In both the first and second embodiments, the mask layer preferably contains silver (Ag) and zinc (Zn) as main components.

In another preferred embodiment, the mask layer contains tellurium (Te) and germanium (Ge) as main components.

In a further preferred embodiment, the mask layer contains elements A, B, and C wherein A is silver (Ag) and/or gold (Au), B is antimony (Sb) and/or bismuth (Bi), and C is tellurium (Te) and/or selenium (Se). The mask layer may further contain indium (In). The mask layer may further contain at least one element M selected from the group consisting of Ti, Zr, Hf, V, Nb, Ta, Mn, W, and Mo.

Further preferably in both the first and second embodiments, the mask layer has an original volume before irradiation of reading light, the mask layer changes its volume as a result of the crystal-to-crystal transition of the mask layer upon irradiation of reading light, and the mask layer returns to the original volume after irradiation of reading light.

ADVANTAGES

Information is read out from the optical information medium of the invention by directing reading light to the mask layer to define a beam spot whereupon the diameter of the beam spot which contributes to read-out is reduced, thereby increasing resolution of read-out. Since the mask layer is formed of a material which undergoes a crystal-to-crystal transition below a predetermined temperature (450°C.), reading light of low power can be used. Then less burden is imposed on the components of the medium, which ensures a higher degree of freedom in selecting a material for the respective components and better repetition durability for the medium. Since the mask layer material undergoes a crystal-to-crystal transition above a predetermined temperature (200°C.), stable read-out is ensured. Since the mask layer undergoes crystal-to-crystal transition by being heated by reading light, the benefits of the invention little depend on the wavelength of reading light.

BRIEF DESCRIPTION OF THE DRAWINGS

The above and other objects, features and advantages of the invention will be better understood from the following description taken in conjunction with the accompanying drawings.

BEST MODE FOR CARRYING OUT THE INVENTION

Figure 1:
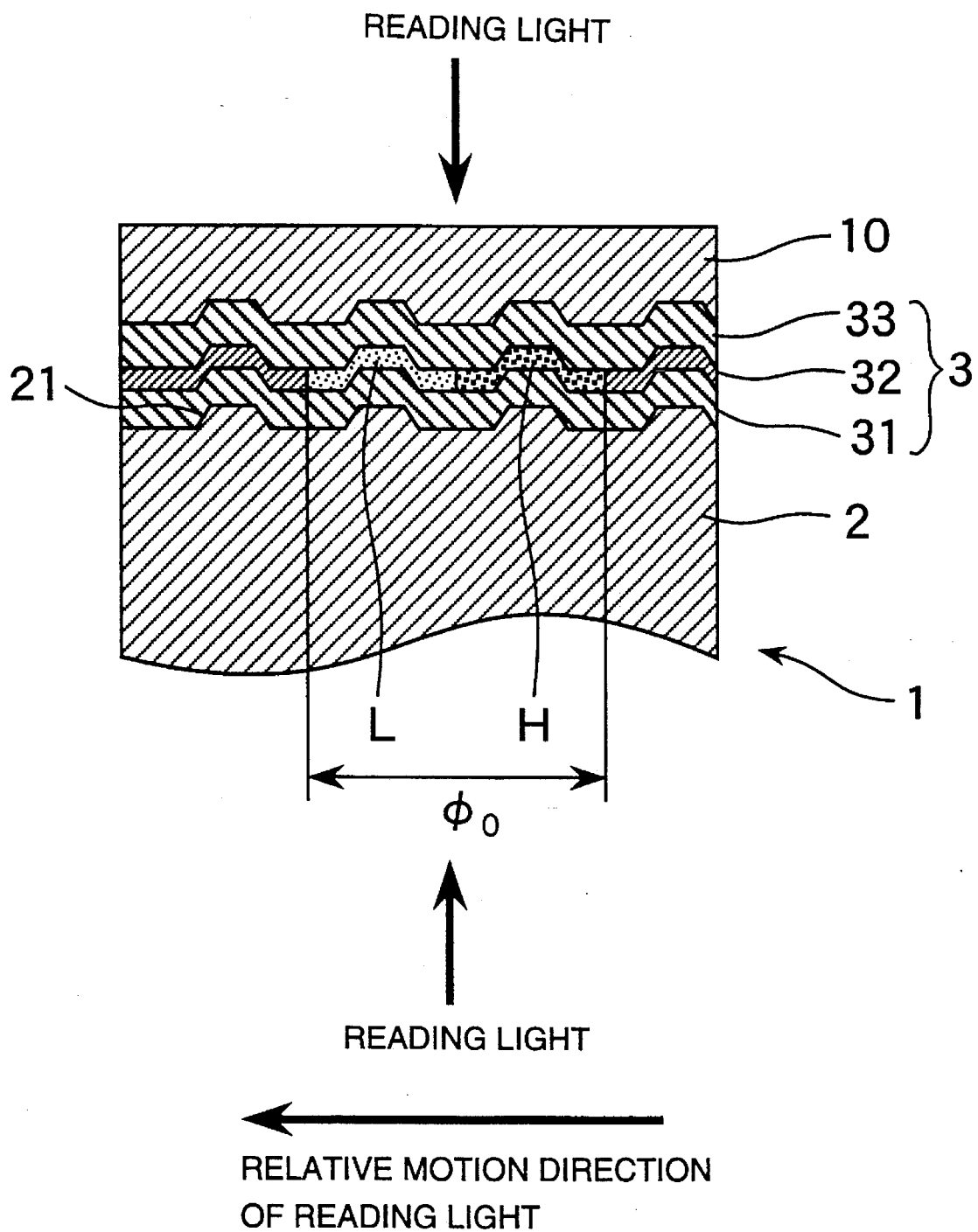
FIG. 1 is a schematic circumferential cross-sectional view of a portion of an optical information medium according to a first embodiment of the invention.

Referring to FIG. 1, there is schematically illustrated a portion of an optical information medium according to the first embodiment of the invention. The optical information medium generally designated at 1 is a read-only optical information medium and includes a substrate 2 having pits 21 formed on one surface for carrying information. A light transmittance control layer 3 is disposed on the substrate surface. The light transmittance control layer 3 includes a lower dielectric layer 31, a mask layer 32, and an upper dielectric layer 33 from the bottom in the described order. A protective layer 10 is disposed on the light transmittance control layer 3. The lower dielectric layer 31 is in contact with the substrate 2 and the upper dielectric layer 33 is in contact with the protective layer 10.

Figure 2:
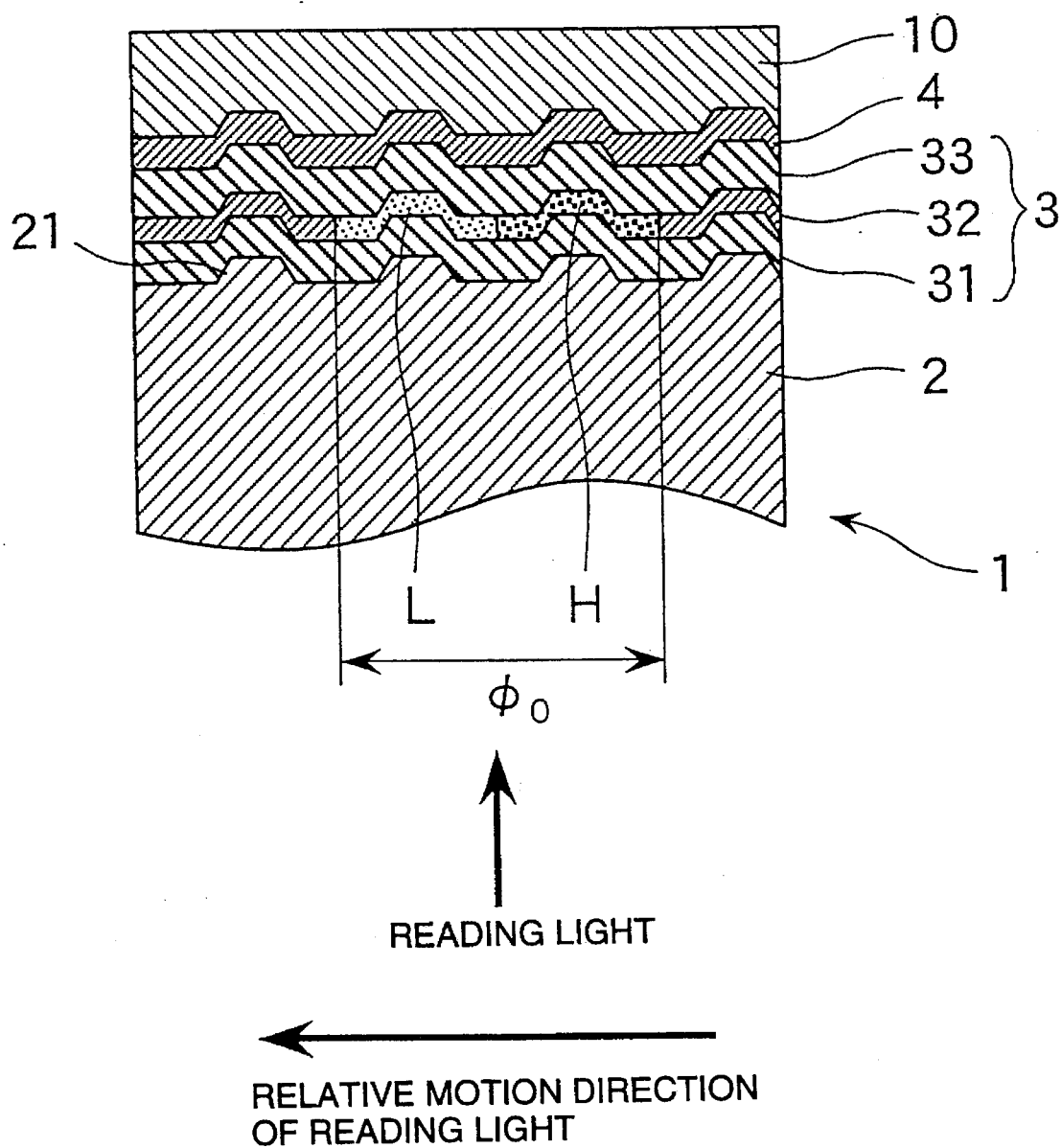
FIG. 2 is a view of the optical information medium of FIG. 1 having a reflecting layer.

Referring to FIG. 2, there is schematically illustrated a portion of another optical information medium according to the first embodiment of the invention. This read-only optical information medium 1 has the same construction as FIG. 1 except that a reflective layer 4 is interposed between the light transmittance control layer 3 and the protective layer 10.

In the optical information medium of the construction illustrated in FIG. 1, reading light may be irradiated to the medium either through the substrate 2 or from the upper dielectric layer 33 side as shown by an upward or downward arrow. In the optical information medium of the construction illustrated in FIG. 2, reading light is irradiated to the medium through the substrate 2 as shown by an upward arrow. It is understood that the embodiment of FIG. 2 may be modified such that the reflecting layer 4 is interposed between the light transmittance control layer 3 and the substrate 2, and then reading light is irradiated from the upper dielectric layer 33 side.

Where reading light is irradiated through the substrate, the substrate should be formed of a material which is substantially transparent to the reading light, for example, resins and glass. Resins are preferred for ease of handling and low cost. Useful resins include acrylic resins, polycarbonate resins, epoxy resins, and polyolefin resins. The pits formed on the substrate surface may be ridges or recesses (more generally, of convex or concave configuration) allowing information to be read out by utilizing a phase difference. The shape and size of the substrate are not critical although it is generally of disc shape and has a diameter of about 50 to about 360 mm and a thickness of about 0.2 to about 3 mm. The substrate may be provided on the surface with grooves or the like for tracking and addressing purposes.

Normally the mask layer has a certain crystalline state, often referred to as an original state, before irradiation of reading light.

The reading light to be irradiated to the optical information medium 1 is typically a laser beam which is focused on nearly the mask layer 32. Then the reading light or laser beam defines a beam spot having an approximately Gaussian intensity profile in a plane of the mask layer. More specifically, the beam spot of reading light has such an intensity profile that intensity declines from near the center toward the periphery. Then, by using reading light of an appropriate power, the mask layer can be partially heated only near the center of the beam spot to a temperature necessary for a crystal-to-crystal transition to occur. It is understood in this regard that since the beam spot of reading light is moving relative to the optical information medium 1 as shown by a horizontal arrow in FIG. 1, the region of the higher temperature is generally the region that is retained within the beam spot for the longer time. In the embodiments shown in FIGS. 1 and 2, the focused beam spot of reading light has a diameter $f_0$, the region of the mask layer 32 which has undergone a crystal-to-crystal transition is designated at H, and the region of the mask layer 32 which is within the beam spot, but remains below the transition temperature is designated at L.

Since a crystal-to-crystal transition causes the mask layer to change its complex part of refractive index and also its real part of refractive index, multiple reflection conditions change in the transition region. By properly selecting the composition of the mask layer, and the thickness and refractive indices of respective layers of the light transmittance control layer, the reflectance of reading light can be either increased or decreased in the region H. Where the reflectance of reading light is increased in the region H in the medium shown in FIG. 1 or where the reflectance of reading light is decreased in the region H in the medium shown in FIG. 2, the resolution of read-out is almost the same as in the situation where a beam spot having an area corresponding to the region H is irradiated for read-out. This means that since the mask layer serves to reduce the beam spot, resolution can be increased without reducing the wavelength of reading light or increasing the numerical aperture of an objective lens in optical read-out system. Where the reflectance of reading light is decreased in the region H in the medium shown in FIG. 1 or where the reflectance of reading light is increased in the region H in the medium shown in FIG. 2, the resolution of read-out is almost the same as in the situation where a beam spot having an area corresponding to the region L is irradiated for read-out, also achieving high resolution.

After the beam spot of reading light has passed over, the mask layer cools down and returns to the original state, that is, the crystalline phase that the mask layer had before irradiation of reading light. Then the complex part of refractive index and real part of refractive index also return to their original values (or values before irradiation of reading light). After passage of the beam spot, the reflectance of the mask layer to reading light quickly comes back to the original level. This minimizes the crosstalk noise between adjacent pits.

According to the present invention, the mask layer undergoes a crystal-to-crystal transition at a temperature in the range of 200° to 450° C., preferably 200° to 400° C. If the transition temperature is below 200° C., the mask layer has a slower cooling rate to allow heat to accumulate in the upper and lower dielectric layers. As a result, the apparent diameter of a beam spot becomes larger, which is disadvantageous for super-resolution read-out. If the transition temperature is above 450° C., reading light of higher power is necessary. It is noted that the mask layer may have two or more crystal-to-crystal transition temperatures as long as the transition temperature at which the above-mentioned effect is derived is available within the above-defined range.

In one preferred embodiment wherein the mask layer has an original volume before irradiation of reading light, the mask layer changes its volume as a result of the crystal-to-crystal transition mentioned above. The mask layer substantially returns to the original volume after irradiation of reading light. Such a volume change taking place in the crystal-to-crystal transition region leads to a larger change of reflectance of reading light and hence, a higher C/N ratio. It is noted that this volume change may be either a volume increase or a volume decrease.

Although the optimum thickness of the mask layer varies with a particular material, it is preferably about 3 to about 100 nm thick, more preferably about 5 to about 50 nm thick. A too thin mask layer would be insufficient for masking purpose whereas a too thick mask layer would cause a drop of light transmittance which will reduce the quantity of read-out signal returned, resulting in a drop of C/N ratio.

The mask layer is formed of a material which can undergo crystal-to-crystal transition. Preferably it contains silver (Ag) and zinc (Zn) as main components; or tellurium (Te) and germanium (Ge) as main components; or elements A, B, and C wherein A is silver (Ag) and/or gold (Au), B is antimony (Sb) and/or bismuth (Bi), and C is tellurium (Te) and/or selenium (Se).

In the embodiment wherein the mask layer contains silver (Ag) and zinc (Zn) as main components, β-ζ transition is utilized. The ratio Zn/(Ag+Zn) is preferably 40 to 60 at%, more preferably 45 to 50 at%. With higher or lower Zn ratios, the transition temperature would not fall in the above-defined range. As long as a transition temperature is available within the above-defined range, compositions wherein at least one of Cu and Au substitutes for at least part of silver and compositions wherein Cd substitutes for at least part of zinc, for example, Ag—Cd are also acceptable.

In the embodiment wherein the mask layer contains tellurium (Te) and germanium (Ge) as main components, the ratio Ge/(Te+Ge) is preferably 20 to 60 at%, more preferably 40 to 50 at%. With higher or lower Ge ratios, the transition temperature would not fall in the above-defined range. Substitution of Se for part of Te and substitution of at least one of Si and Bi for part of Ge are acceptable insofar as the degree of substitution is below 50 at %.

In the embodiment wherein the mask layer contains elements A, B, and C as defined above, there are generally present an $ABC_2$ phase such as $AgSbTe_2$ phase and a B phase such as Sb phase. Preferably the mask layer further contains indium. Indium bonds with C and is present as an In-C phase, typically In-Te phase. The In-C phase contains In and C substantially in a ratio of 1:1. All the $ABC_2$, B, and In-C phases are crystalline. The presence of respective phases is ascertainable by observation under a transmission electron microscope and electron probe microanalysis (EPMA). The mask layer may further contain at least one element M selected from the group consisting of Ti, Zr, Hf, V, Nb, Ta, Fin, W, Mo, Si, and Sn. Element M is effective for improving stability in repetitive read-out, that is, reliability. Among these, vanadium and titanium, especially vanadium are more effective for improving reliability. Preferably at least one of vanadium and titanium, especially vanadium occupies 80 at % or more of the entire elements M, most preferably 100 at %. Besides, inclusion of copper, nickel, zinc, iron, oxygen, nitrogen, and carbon as trace impurities is acceptable although the total content of these impurities should preferably be less than 0.05 at % of the mask layer.

It is believed that in the mask layer containing elements A, B, and C, a crystal-to-crystal transition occurs as a change of balance between $ABC_2$ and B phases. It was empirically found in X-ray diffractometry that in excess of the transition temperature (about 320°C.), the peak of $ABC_2$ phase increased its intensity while the peak intensity of B phase became low. The reason is that the B phase is accommodated by the $ABC_2$ phase because the $ABC_2$ phase is more stable than the B phase.

This mask layer can be represented by the formula:

$$A_a B_b C_c In_d M_e$$

wherein A is silver and/or gold, B is antimony and/or bismuth, C is tellurium and/or selenium, In is indium, M is at least one of Ti, Zr, Hf, V, Nb, Ta, Mn, W, and Mo, and letters a, b, c, d, and e representing atomic ratios of the associated elements are in the range: $3.0 \leq a \leq 13.0$, $45.0 \leq b \leq 87.0$, $8.0 \leq c \leq 34.0$, $2.0 \leq d \leq 8.0$, and $0 \leq e \leq 5.0$, preferably in the range: $6.0 \leq a \leq 10.0$, $50 \leq b \leq 65$, $15 \leq c \leq 32$, $3.0 \leq d \leq 6.0$, and $0 \leq e \leq 3.0$, provided $a+b+c+d+e=100$. If any of a to e is outside the range, no crystal-to-crystal transition would occur or the mask layer would slowly return to the original state, restraining super-resolution read-out. Silver is preferred as element A. Preferably at least 56 at %, more preferably at least 80 at % of element A is silver. Most preferably silver is solely used as element A. If a Au percentage in element A is too high, growth of $ABC_2$ phase at about the transition temperature would be inhibited, resulting in a smaller change of refractive index. Antimony is preferred as element B. Preferably at least 50 at %, more preferably at least 80 at % of element B is antimony. Most preferably antimony is solely used as element B. Tellurium is preferred as element C. Preferably at least 50 at %, more preferably at least 80 at % of element C is tellurium. Most preferably tellurium is solely used as element C. If a Se percentage in element C is too high, an $ASeC_2$ phase would grow to inhibit growth of an $ASbC_2$ phase.

Any desired method like sputtering and evaporation may be used in forming the mask layer.

The mask layer 32 is sandwiched between the lower and upper dielectric layers 31 and 33. This sandwich structure not only permits the mask layer which has changed its volume upon irradiation of reading light to quickly return to the original volume, but also prevents the mask layer from any structural change such as segregation and element diffusion during repetitive read-out. Since the mask layer 32 is heated to a somewhat high temperature during read-out, the substrate 2 and protective layer 10 which are formed of less heat resistant resins can be thermally deformed. The lower and upper dielectric layers 31 and 33 are also effective for preventing such thermal deformation by their elastic recovery. The material of which the dielectric layers are formed is not critical. Exemplary dielectric materials include $SiO_2$, mixtures of $SiO_2$ and ZnS, materials containing La, Si, O and N known as LaSiON, materials containing Si, Al, O and N known as SiAlON, SiAlON further containing y, and NdSiON. The dielectric layers may have any desired thickness as long as the above-mentioned effects are fully exerted. In general, the lower dielectric layer is about 10 to about 250 nm thick and the upper dielectric layer is about 10 to about 250 nm thick. The dielectric layers are preferably formed by gas phase deposition methods such as sputtering and evaporation.

The reflecting layer 4 is provided for the purpose of increasing the quantity of reflected light from the medium. Any desirable material may be used to form the reflecting layer. Preferred are high reflectance metals such as Al, Au, Ag, Pt, Cu alone or alloys containing at least one of these elements. The reflecting layer is preferably about 30 to about 150 nm thick. A too thin reflecting layer would fail to provide sufficient reflectance whereas increasing the thickness of the reflecting layer beyond necessity would achieve a slight improvement in reflectance at the expense of cost. The reflecting layer is preferably formed by gas phase deposition methods such as sputtering and evaporation.

The protective layer 10 is provided for the purpose of improving scratch and corrosion resistance. It is preferably formed of organic materials, more preferably radiation-curable compounds and compositions containing the same, which are cured by exposure to radiation, typically electron radiation and ultraviolet radiation. The protective layer is generally about 0.1 to about 100 μm thick. It may be formed by any desirable one of conventional coating methods including spin coating, gravure coating, spray coating, and dipping.

The present invention is also applicable to optical recording media. The optical recording medium is obtained by providing a recording layer above or below the light transmittance control layer of the read only optical information medium thus far described. Where the medium includes a reflecting layer, the recording layer is interposed between the light transmittance control layer and the reflecting layer. Alternatively, the light transmittance control layer is interposed between the recording layer and the reflecting layer. In the former, if desired, a dielectric layer may be formed between the reflecting layer and the recording layer for the purpose of protecting the recording layer and controlling heat release. The substrate of the optical recording medium may be provided with pits for carrying read only information in addition to grooves.

Figure 3:
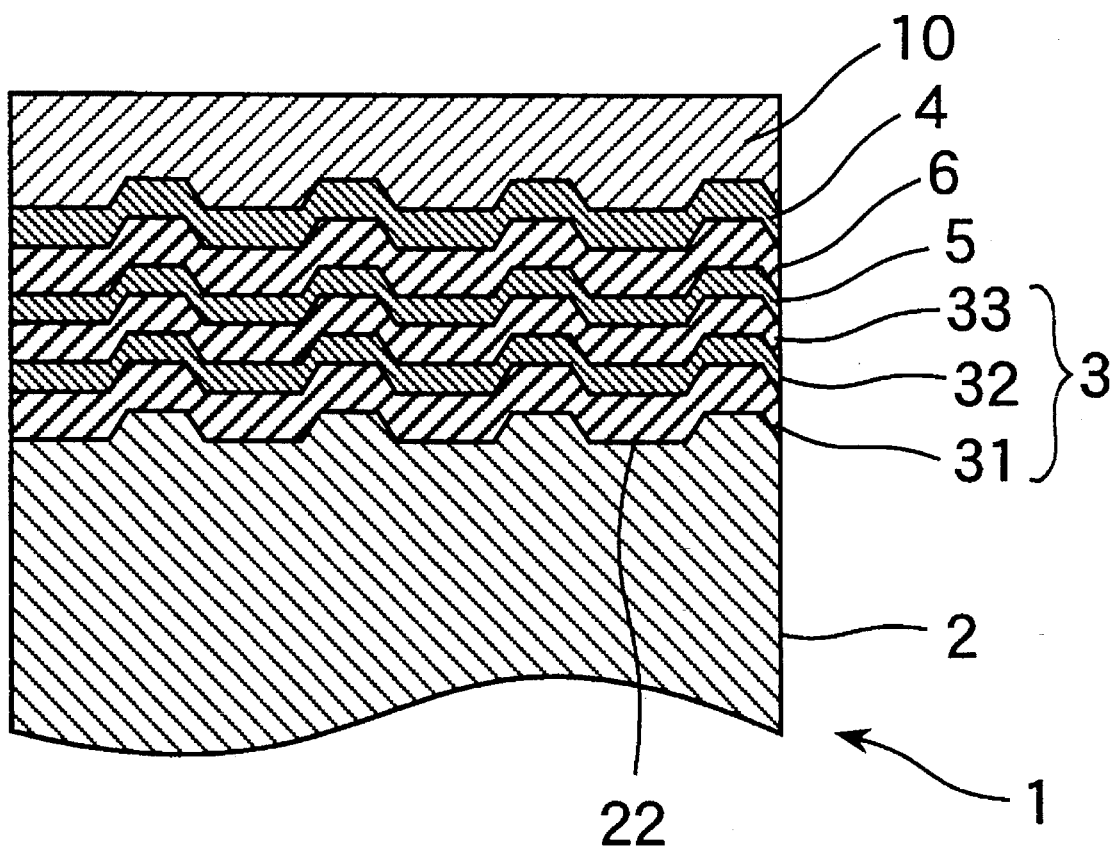
FIG. 3 is a schematic radial cross-sectional view of a portion of an optical information medium according to a second embodiment of the invention.
Figure 3:

One exemplary structure of the optical recording medium is shown in FIG. 3 as including a substrate 2 having grooves 22, a light transmittance control layer 3 (including a lower dielectric layer 31, a mask layer 32, and an upper dielectric layer 33), a recording layer 5, a dielectric layer 6, a reflecting layer 4, and a protective layer 10 stacked in the described order from below. It is to be noted that since FIG. 3 is a radial cross section of the medium (typically disc), the direction of relative motion of writing and reading light is perpendicular to the plane of paper of this figure.

When reading light is directed to the recording layer from the light transmittance control layer side, the light beam reaches the recording layer after the beam spot is reduced through the region H or L of the mask layer as in the case of the read only optical information medium mentioned above. This ensures high resolution upon read-out. When reading light enters the medium from the recording layer side, the light beam having passed through the recording layer is selectively transmitted or reflected by the region H or L of the mask layer so that the reflected light with a reduced beam diameter is available from the medium, also achieving high resolution.

Since high resolution is achieved by the above-mentioned mechanism during read-out of the optical recording medium, the benefit of the invention does not depend on the construction of the recording layer. Therefore, the present invention is applicable to magneto-optical recording media having a magneto-optical recording layer of rare earth element-transition metal element alloys, optical recording media having a phase change type recording layer utilizing an amorphous-crystalline phase change of $Sb_2Se_3$, etc., and optical recording media having a write-once recording layer using organic dyes such as cyanine dyes as the recording material. In the case of optical recording media having a phase change type recording layer, the recording layer may be made of the same composition as the above-mentioned mask layer material.

In some media requiring recording light of high power, there is a possibility that the mask layer be melted by irradiation of that recording light and become amorphous after recording. In such a case, the mask layer is preferably initialized (i.e., crystallized) before the start of read-out.

The power of reading light irradiated to the optical information medium of the invention may be determined without undue experimentation. Usually the reading light power $P_R$ is about 1 to about 10 mW although it varies with the construction of the medium and the linear velocity of the beam spot of reading light relative to the medium. Advantageously read-out with a power of less than about 5 mW is possible. The linear velocity of the beam spot of reading light relative to the medium is generally about 1 to about 10 m/s while it may be suitably determined so as to enable read-out through the above-mentioned mechanism.

Although the invention is described in conjunction with a one-side medium having the information carrying or recording means only on one surface of a substrate, the invention is also applicable to a double-sided medium of one type in which a pair of one-side media are joined such that the information carrying or recording means are sealingly located inside or another type in which information carrying or recording means are provided on both sides of a substrate.

EXAMPLE

Examples of the present invention are given below by way of illustration and not by way of limitation.

Example 1

An optical recording disc sample was fabricated by injection molding a disc-shaped substrate having a diameter of 130 mm and a thickness of 1.2 mm from polycarbonate while grooves were simultaneously formed in one surface thereof. On the grooved substrate surface, a lower dielectric layer of ZnS—SiO$_2$ having a thickness of 130 nm, a mask layer, an upper dielectric layer of ZnS—SiO$_2$ having a thickness of 180 nm, a phase change recording layer, an uppermost dielectric layer of ZnS—SiO$_2$ having a thickness of 20 nm, a reflecting layer of gold having a thickness of 100 nm, and a protective layer of ultraviolet-cured resin having a thickness of 5 μm were sequentially formed in the described order.

The dielectric layers and reflecting layer were formed by sputtering. Each dielectric layer contained ZnS and SiO$_2$ in a molar ratio of 0.85:0.15. The ZnS—SiO$_2$ had a refractive index of 2.3 at wavelength 780 nm.

The mask layer was 30 nm thick and the recording layer was 20 nm thick. They were formed by sputtering. The mask layer had a composition in atom ratio: $Ag_9Sb_{55}Te_{30}In_5V_1$. The recording layer had the same composition as the mask layer. The target used in sputtering was an antimony target having chips of Ag, In, Te, and V attached thereto.

While the disc sample was rotated at a linear velocity of 2.8 m/s, laser light having a power of 9.0 mW and a wavelength of 780 nm was irradiated to the disc for initializing (or crystallizing) the recording and mask layers. Then signals of 4 MHz were recorded using writing laser light having a power $P_W$ of 15 mW and a wavelength of 780 nm. As a result of recording, the recorded portion was reduced in reflectance.

Next, the portion of the mask layer which had been partially amorphous as a result of irradiation of writing light was initialized (i.e., crystallized). Initialization of the mask layer was to erase recorded signals which had been left in the mask layer after recording. The power of laser light necessary for initialization depended on the linear velocity of the disc sample. Specifically, the power for initialization was 3 mW for a linear velocity of 2.8 m/s, 2.5 to 3 mW for a linear velocity of 1.4 m/s, and 2 mW for a linear velocity of 1 m/s or less.

Figure 4:
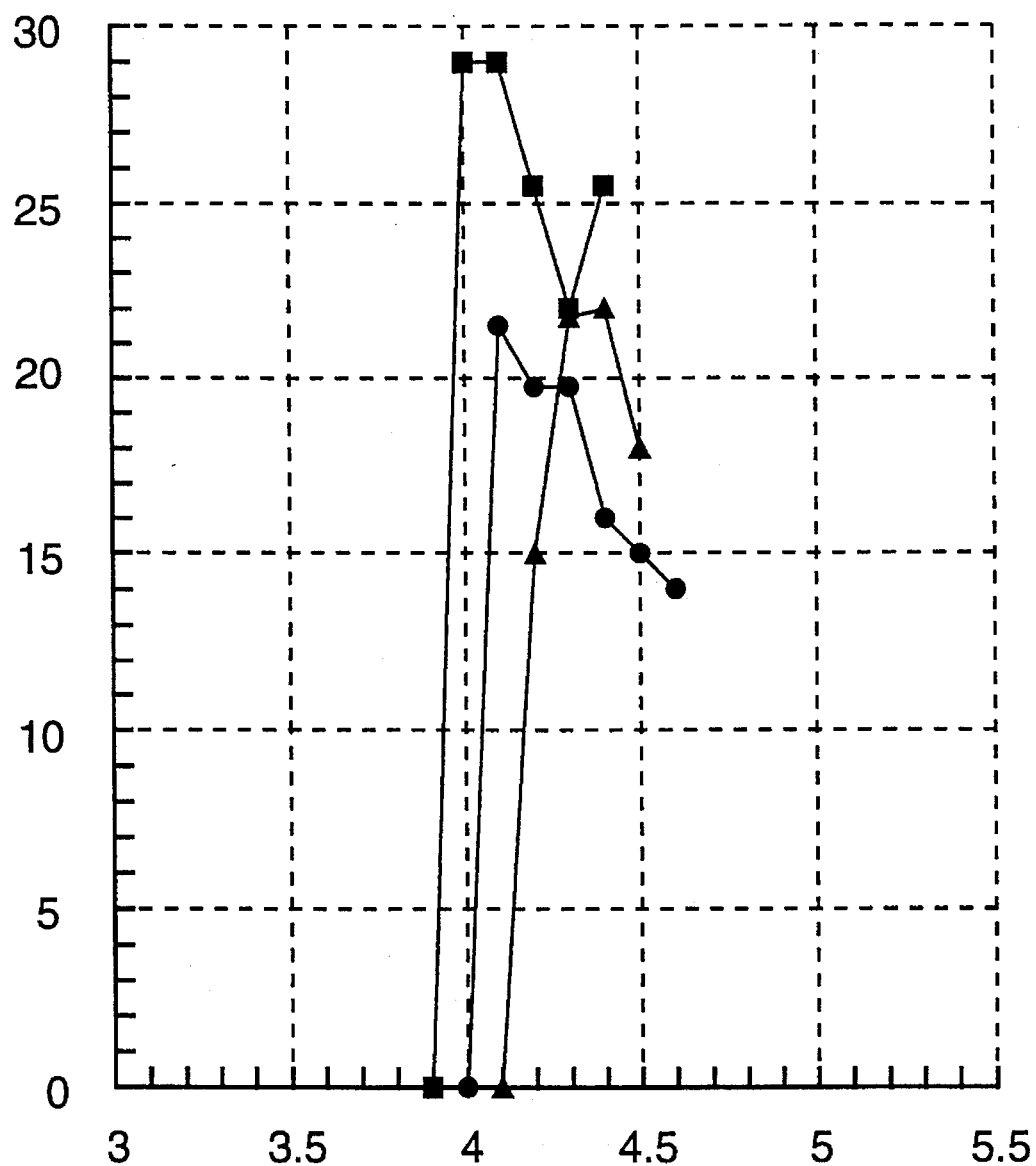
FIG. 4 is a graph showing the C/N ratio of an optical information medium relative to the power of reading light.

While rotating the initialized disc sample at a linear velocity of 0.4, 0.6 and 1.4 m/s, reading laser light of 780 nm in wavelength was irradiated to the disc sample. A C/N ratio of read signals was measured while varying the power of reading laser light $P_R$. The results are plotted in FIG. 4. The power of reading light necessary for read-out was about twice the power necessary for initialization. Differential thermal analysis showed that the mask layer had a crystallization temperature of 175° C., a melting point of 525° C., and a crystal-to-crystal transition temperature of about 320° C. This suggested that the mask layer was not melted upon irradiation of reading light, and a crystal-to-crystal transition occurring in the mask layer enabled super-resolution read-out.

The complex refractive index ($n_0-ik_0$) of the mask layer at a wavelength of 780 nm was measured at room temperature and 320° C. To this end, the mask layer was singly formed on a glass substrate and measured for a coefficient of spectral transmission at that wavelength. The results were: $n_0=6.2$ and $k_0=3.2$ at room temperature and $n_0=2.3$ and $k_0=2.5$ at 320° C. Thus a reduction of $n_0$ by a crystal-to-crystal transition of the mask layer was $\Delta n_0=3.9$ and a similar reduction of $k_0$ was $\Delta k_0=0.7$. It is believed from the construction of the disc sample, $\Delta n_0$, $\Delta k_0$, and C/N ratio reported above that the mask layer had increased its volume as a result of a crystal-to-crystal transition.

Example 2

An optical information medium sample was fabricated as in Example 1 by forming on a substrate in the form of a slide glass of 1.2 mm thick, a lower dielectric layer of 170 nm thick, a mask layer, an upper dielectric layer of 17 nm thick, and a reflecting layer of 100 nm thick in the described order. The dielectric layers, mask layer, and reflecting layer had the same compositions as in Example 1.

Figure 5:
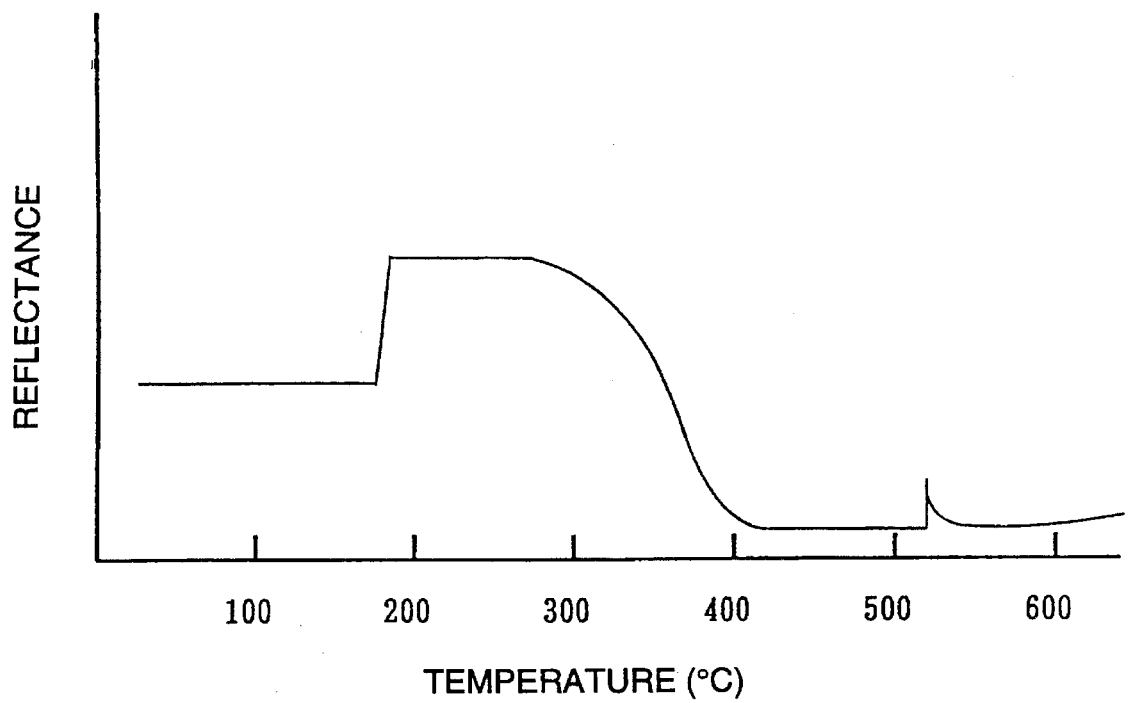
FIG. 5 is a graph showing the reflectance of a medium relative to the temperature of the mask layer.

The sample was heated to examine the reflectance of the sample at a wavelength of 780 nm relative to the temperature of the mask layer. The reflectance vs. temperature curve is shown in FIG. 5. A sudden increase of reflectance appears at a temperature slightly lower than 200° C. in FIG. 5, which is attributable to crystallization of the mask layer. The reflectance declines as the temperature rises from slightly below 300° C., which is attributable to a crystal-to-crystal transition of the mask layer.

Example 3

An optical information medium sample was fabricated as in Example 2 by forming on a substrate in the form of a slide glass of 1.2 mm thick, a lower dielectric layer of 170 nm thick, a mask layer, and an upper dielectric layer of 170 nm thick in the described order. The dielectric layers and mask layer had the same compositions as in Example 2.

Figure 6:
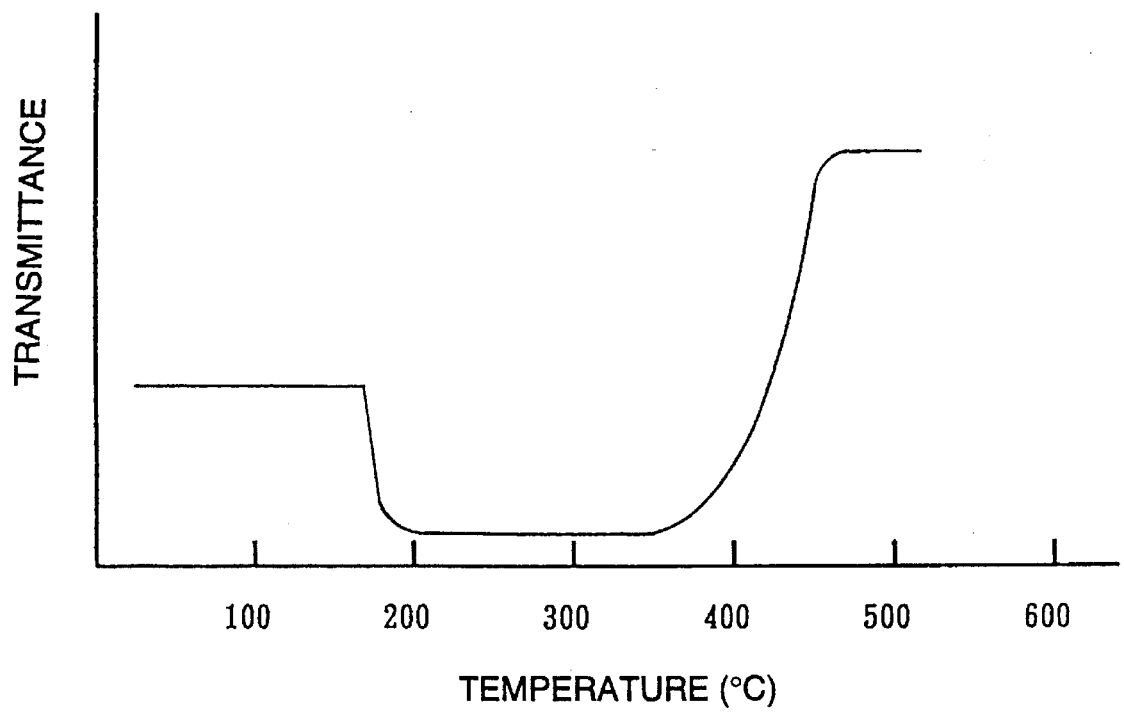
FIG. 6 is a graph showing the transmittance of a medium relative to the temperature of the mask layer.

The sample was heated to examine the transmittance of the sample at a wavelength of 780 nm relative to the temperature of the mask layer. The transmittance vs. temperature curve is shown in FIG. 6. A sudden drop of transmittance appears at a temperature slightly lower than 200° C. in FIG. 6, which is attributable to crystallization of the mask layer. The transmittance increases as the temperature rises from slightly below 300° C., which is attributable to a crystal-to-crystal transition of the mask layer.

Both the reflectance and transmittance curves of FIGS. 5 and 6 showed moderate changes with a temperature rise probably because the samples were heated at a low rate. The temperature at which such a change started was different between FIGS. 5 and 6 probably because the samples were heated at different rates. The heating rate was 200° C./hour in FIG. 5 and 400° C./hour in FIG. 6.

Equivalent results were observed when the mask layer was formed of $Ag_{52.5}Zn_{47.5}$ having a crystal-to-crystal transition temperature of 280° C. and $Te_{50.6}Ge_{49.4}$ having a crystal-to-crystal transition temperature of 360° C.

The effectiveness of the present invention is evident from the results of Examples.

Japanese Patent Application No. 164577/1994 is incorporated herein by reference.

While the invention has been described in connection with what is presently considered to be the most practical and preferred embodiment, it will be understood that the invention is not to be limited to the disclosed embodiment, but on the contrary, is intended to cover various modifications and equivalent arrangements included within the spirit and scope of the appended claims.

We claim:

1. An optical information medium comprising a substrate having pits formed on one surface for carrying information and a light transmittance control layer on the substrate surface including a lower dielectric layer, a mask layer and an upper dielectric layer, and further comprising:

a reflecting layer of 3 to 150 nm thick formed at least one of above and below said light transmittance control layer, the mask layer having an original state before irradiation by reading light and is 3 to 100 nm thick, the mask layer undergoing a crystal-to-crystal transition upon irradiation by reading light to introduce a change in the reflectance of the reading light, the crystal-to-crystal transition taking place at a temperature of 200 to 450 degrees C, and the mask layer returning to the original state after irradiation by reading light.

2. An optical information medium comprising a substrate, a light transmittance control layer on a surface of the substrate and including a lower dielectric layer, a mask layer and an upper dielectric layer, and a recording layer formed at least one of above and below said light transmittance control layer, and further comprising:

a reflecting layer of 3 to 150 nm thick, at least one of: (1) said recording layer being interposed between said light transmittance control layer and said reflecting layer and (2) said light transmittance control layer being interposed between said recording layer and said reflecting layer, the mask layer having an original state before irradiation by reading light and is 3 to 100 nm thick, the mask layer undergoing a crystal-to-crystal transition upon irradiation by reading light to introduce a change in the reflectance of the reading light, the crystal-to-crystal transition taking place at a temperature of 200 to 450 degrees C, and the mask layer returning to the original state after irradiation by reading light.

3. The optical information medium of claim 2 and which is an optical recording medium wherein said recording layer is at least one of a phase change type and a magneto-optical type.

4. The optical information medium of claim 2 which is an optical recording medium wherein said recording layer is at least one of the phase change type and magneto-optical type.

5. The optical information medium of claim 2, wherein said mask layer contains silver and zinc as main components and the Zn/(Zn+Ag) ratio is 40 to 60 at %.

6. The optical information medium of claim 2, wherein said mask layer contains tellurium and germanium as main components and the Ge/(Te+Ge) ratio is 20 to 60 at %.

7. The optical information medium of claim 2 wherein said mask layer contains elements A, B and C, wherein A is silver, gold or a mixture thereof, B is antimony, bismuth or a mixture thereof, and C is tellurium, selenium or a mixture thereof.

8. The optical information medium of claim 2, wherein said mask layer has an original volume before irradiation by reading light, the mask layer changing its volume as a result of the crystal-to-crystal transition of the mask layer upon irradiation of reading light, and the mask layer returning to the original volume after irradiation by reading light.

9. The optical information medium of claim 1, wherein said mask layer contains silver and zinc as main components and wherein the Zn/(Zn+Ag) ratio is 40 to 60 at %.

10. The optical information medium of claim 1, wherein said mask layer contains tellurium and germanium as main components and wherein the Ge/(Te+Ge) ratio is 20 to 60 at %.

11. The optical information medium of claim 1 wherein said mask layer contains elements A, B, and C wherein A is silver, gold or a mixture thereof, B is antimony, bismuth or a mixture thereof, and C is tellurium, selenium or a mixture thereof.

12. The optical information medium of claim 11 wherein said mask layer further contains indium.

13. The optical information medium of claim 12 wherein said mask layer further contains at least one element M selected from the group consisting of Ti, Zr, Hf, V, Nb, Ta, Mn, W, and Mo.

14. The optical information medium of claim 1, wherein the mask layer has an original volume before irradiation by reading light, the mask layer changing its volume as a result of the crystal-to-crystal transition of the mask layer upon irradiation by reading light, and the mask layer returning to the original volume after irradiation by reading light.

* * * * *